(12) United States Patent
Fritsch et al.

(10) Patent No.: US 8,920,758 B2
(45) Date of Patent: Dec. 30, 2014

(54) METHOD FOR OPERATING AN EXHAUST GAS AFTERTREATMENT SYSTEM WITH AT LEAST ONE FIRST SCR DEVICE AND AT LEAST ONE SECOND SCR DEVICE

(71) Applicant: Robert Bosch GmbH, Stuttgart (DE)

(72) Inventors: Andreas Fritsch, Waiblingen (DE); Andreas Holzeder, Zusmarshausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/090,691

(22) Filed: Nov. 26, 2013

(65) Prior Publication Data

US 2014/0147355 A1  May 29, 2014

(30) Foreign Application Priority Data

Nov. 29, 2012 (DE) .......................... 10 2012 221 905

(51) Int. Cl.
*B01D 53/94* (2006.01)
*F01N 3/18* (2006.01)
*F01N 3/20* (2006.01)

(52) U.S. Cl.
CPC ............. *B01D 53/9495* (2013.01); *Y02T 10/47* (2013.01); *Y02T 10/24* (2013.01)
USPC .............. 423/213.2; 60/274; 60/276; 60/299; 60/301

(58) Field of Classification Search
USPC .................. 423/213.2; 60/274, 276, 299, 301
See application file for complete search history.

(56) References Cited

U.S. PATENT DOCUMENTS

| | | | |
|---|---|---|---|
| 8,629,781 B2 * | 1/2014 | Kowalkowski et al. | 340/633 |
| 2011/0023456 A1 * | 2/2011 | Levijoki et al. | 60/274 |
| 2013/0232958 A1 * | 9/2013 | Ancimer et al. | 60/301 |
| 2014/0056788 A1 * | 2/2014 | Breitschaedel et al. | 423/212 |

* cited by examiner

*Primary Examiner* — Timothy Vanoy
(74) *Attorney, Agent, or Firm* — Michael Best & Friedrich LLP

(57) ABSTRACT

A method for operating an exhaust gas aftertreatment system is provided that comprises at least one first SCR device and at least one second SCR device. Furthermore, a dosing device for reactant for supplying the SCR devices is provided upstream of the first SCR device in the exhaust gas flow direction. In one embodiment, a target overall efficiency $\eta_{Des}$ of the SCR devices is specified. Using modeling of the exhaust gas aftertreatment system, depending on the target overall efficiency $\eta_{Des}$ a target value $\Theta_{1,Des}$ is determined that represents the degree of charge of the first SCR device with reactant. The dosing of the reactant is adjusted accordingly to achieve the target value $\Theta_{1,Des}$.

13 Claims, 2 Drawing Sheets

ID ONE FIRST SCR DEVICE AND AT
LEAST ONE SECOND SCR DEVICE

BACKGROUND OF THE INVENTION

The present invention relates to a method for operating an exhaust gas aftertreatment system with at least one first SCR device and at least one second SCR device and a dosing device for reactant for the SCR devices disposed upstream of the first SCR device in the exhaust gas flow direction. Moreover, the present invention relates to a computer program and a computer program product with program code that are suitable for implementing said method.

In order to satisfy increasingly stringent emission legislations, especially for motor vehicles, it is necessary to reduce the content of nitrogen oxides (NOx) in the exhaust gas of internal combustion engines, in particular for diesel engines. For this purpose, SCR catalyzers (Selective Catalytic Reduction) are known, which are disposed in the exhaust gas region of an internal combustion machine, wherein the SCR catalyzers reduce the nitrogen oxide contained in the exhaust gas of the internal combustion machine to nitrogen in the presence of a reducing agent. For the process of the reaction, ammonia ($NH_3$) is required as a reducing agent or reactant, which is admixed with the exhaust gas. For the provision of ammonia an aqueous urea solution is normally used, which is introduced into the exhaust system upstream of the SCR catalyzer using a dosing device. $NH_3$ separates from said solution and can act as a reducing agent in the SCR catalyzer. In order to achieve high conversion rates in the SCR catalyzer during the reduction of the nitrogen oxides, the SCR catalyzer must be operated such that it is continually filled up to a certain level with the reducing agent ammonia.

Systems are already known for achieving higher conversion rates of nitrogen oxide reduction in the exhaust system, which use two separate SCR catalyzers. So-called SCRF systems are also known, which comprise a particle filter that is coated with SCR material and a downstream conventional SCR catalyzer. Such systems with two SCR devices can be controlled in a conventional manner with duplicated software for process control purposes, wherein the variables for the process control for each SCR device can be obtained from known catalyzer models. Models of SCR catalyzers that are known from the literature can be implemented in the control devices of modern motor vehicles and represent both the NOx conversion of the SCR catalyzer and also the $NH_3$ slip. As a result of the duplicated software or the duplicated modeling of the SCR devices provided in the system, i.e. in particular two SCR catalyzers connected in series, the process control for said system is relatively complex and also unreliable. In contrast, the object of the present invention is to improve and optimize the process control for two SCR devices connected in series.

This object is achieved by a method for operating an exhaust gas aftertreatment system with at least one first and at least one second SCR device according to embodiments of the invention. Preferred embodiments of said method and a corresponding computer program and a corresponding computer program product for implementing the method are apparent from the claims and description provided herein.

The method according to the invention is based on an exhaust gas aftertreatment system, which comprises at least one first SCR device and at least one second SCR device. These can be similar or even different types of SCR devices. For example, the first SCR device can be a particle filter with SCR coating (SCRF=SCR on Filter). The second SCR device can be a normal SCR catalyzer. Furthermore, it is provided that the second SCR device is supplied with reactant that escapes from the first SCR device. The second SCR device thus receives the reducing agent from the $NH_3$ slip of the first SCR device, e.g. from the particle filter with SCR coating. The first SCR device is supplied with reactant by a dosing device, wherein the dosing device is disposed upstream of the first SCR device looking in the exhaust gas flow direction. Unconverted reactant in the first SCR device passes through the first SCR device and is available to the second SCR device for reduction of the nitrogen oxides. The core of the invention is that an overall optimization for NOx and $NH_3$ is achieved using an analytical overall SCR model. In contrast to conventional process control for systems with two SCR devices, the SCR devices are not optimized separately but as an entire system. For this purpose, according to the invention a desired overall efficiency $\eta_{Des}$ is specified for the two SCR devices. Using modeling of the exhaust gas aftertreatment system, depending on the specified overall efficiency $\eta_{Des}$ a target value $\Theta_{1,Des}$ is determined, wherein $\Theta_{1,Des}$ represents the degree of charge of the first SCR device with reactant. Finally, the dosing of the reactant that is necessary to achieve the target value $\Theta_{1,Des}$ is adjusted, wherein the dosing device disposed upstream of the first SCR device is controlled accordingly. By this method considerable improvements can be achieved in the application and in the quality of the process control for exhaust gas aftertreatment systems with at least one first and at least one second SCR device. In particular, the $NH_3$ supply of the downstream SCR catalyzer or the downstream SCR device is improved, wherein at the same time the reducing agent slip ($NH_3$ slip) downstream of the second SCR device remains under control. Thus a significantly higher NOx conversion can be achieved at the same time as low $NH_3$ slip of the entire system.

The essential optimizing target of the method according to the invention is the conversion of NOx. If a target NOx conversion is specified, which in particular is necessary to achieve a specified emission target, then for a known $NH_3$ charge of the downstream SCR device it can be determined by computer how much reducing agent must be provided in the upstream SCR device (e.g. SCRF) in order to achieve said target. Said level or degree of charge of the first SCR device can be relatively rapidly adjusted by dosing the reactant. The strategy according to the invention optimizes the $NH_3$ slip of the entire system at the same time, because the $NH_3$ slip arises because of overfilling of the second SCR device with reactant. The higher the level of charge of the downstream SCR device, the more NOx conversion can be carried out by the second SCR device and the lower is the required level or degree of charge in the first SCR device. According to the invention, the tendency to $NH_3$ slip, i.e. the $NH_3$ that leaves the second SCR device, is therefore implicitly minimized.

The method according to the invention is not restricted to the coupling of an SCR coated particle filter with an SCR catalyzer. The advantages of the method according to the invention can also be used in the same way for e.g. two SCR catalyzers connected in series.

The target overall efficiency $\eta_{Des}$ or corresponding variables that represent said overall efficiency can be specified as a fixed application value or depending on different variables, e.g. depending on the working point and/or the temperature in particular in the exhaust gas aftertreatment system and/or the mass flow in the exhaust system and/or the driving speed and/or the already accumulated NOx emissions.

Different variables are included in the modeling of the exhaust gas aftertreatment system (deNOx system), in particular the volumetric flow of exhaust gas and/or the mass flow of exhaust gas and/or temperatures in the system and/or the level or degree of charge in at least one of the SCR devices and/or the ratio of $NO_2$ to NOx. The input variables can be measured or simulated. Using modeling of the deNOx system the target degree of charge (target degree of coverage) $\ominus_{1,Des}$ for the first SCR device, at which the deNOx system has an overall efficiency of $\eta_{Des}$, can be calculated.

The variables that are included in the modeling can be actual values or applicable values. In particular, an actual value or an applicable value, in particular an average anticipated value, can be used for the value of the volumetric flow of exhaust gas and/or the mass flow of exhaust gas.

The calculation of $\ominus_{1,Des}$ can e.g. be carried out using the following formula:

$$\theta_{1,Des} = \frac{-\dot{V}_1}{k_{reac1}\exp(-E_{reac1}/(R\cdot T_1))A_1}\ln(1-\eta_{Des}) - \frac{k_{reac2}\theta_2\exp(-E_{reac2}/(R\cdot T_2))A_2 T_1}{k_{reac1}\exp(-E_{reac1}/(R\cdot T_1))A_1 T_2}$$

Here index 1 refers to the variables in the first SCR device and index 2 to the variables in the second SCR device. $\dot{V}_1$ refers to the volumetric flow, $k_{reac}\exp(-\ldots)$ refers to an Arrhenius rule known from the literature for a catalyzed reaction running in the SCR device, e.g. a certain NOx reaction or even other reactions, e.g. such as $NH_3$ oxidation, nitrous oxide formation, nitrate formation or other. The Arrhenius rule illustrated in the formula stands by way of example for a first order reaction in NOx, i.e. the reaction rate of NOx $r_{reac}$ in [mol/s] is proportional to $r_{reac} \sim k_{reac} c_{NOx} \exp(-E/(R \cdot T))$. Here $c_{NOx}$ refers to the concentration of NOx at the inlet of the respective catalyzer. $E_{reac,i}$ refers to the activation energy for the NOx reaction in the $i^{th}$ catalyzer (i=1 or i=2). A refers to the catalytically active areas in the SCR devices and T the temperatures in the respective SCR devices.

It is possible to use the different reactions known from the literature for an SCR reaction, in particular a standard SCR reaction, a slow SCR reaction and/or a fast SCR reaction as a basis for the calculation according to the invention. With particular advantage it is possible to combine the different known reactions to form a representative reaction and thus to represent all possible conditions in the SCR devices or in the entire deNOx system. Depending on the complexity of the underlying model, it can be that the equations can no longer be solved analytically for $\ominus$. In this case it is expedient to solve the equations numerically in the control device.

After determining the target value $\ominus_{1,Des}$, i.e. the target value for the degree of charge of the first SCR device for a given overall efficiency $\eta_{Des}$, the dosing of the reactant is adjusted accordingly. Advantageously, the dosing of the reactant can be carried out with a level regulator, which is present in many conventional systems as standard. Here the term level refers to the product of the degree of coverage or degree of charge and the maximum level of the SCR device with reducing agent. Normally here a P regulator for level adjustment is set to a pilot component.

Furthermore, advantageously the degree of charge of the second SCR device can be monitored. Here the dosing can be adjusted such that the second SCR device is not excessively charged with reactant, and therefore an excessively large $NH_3$ slip is avoided.

Furthermore, it can be provided that combustion residues, i.e. in particular soot or ash, in the SCR devices and in particular in the first SCR device, e.g. in the SCRF, are taken into account and e.g. are included in the modeling of the deNOx system.

Finally, the invention includes a computer program that executes all steps of the described method if it is implemented on a computing device or a control device, and a computer program product with program code that is stored on a machine-readable medium for implementing the method according to the invention if the program is executed on a computing device or a control device. The implementation of the method according to the invention as a computer program or as a computer program product has the advantage that said program can easily be used even in existing motor vehicles, in order to be able to exploit the advantages in the process control of an exhaust gas aftertreatment system with two or more SCR devices.

BRIEF DESCRIPTION OF THE DRAWINGS

Further features and advantages of the invention are apparent in the following description of exemplary embodiments in combination with the figures. Here the individual features can each be effected individually or in combination with each other.

In the figures.

DETAILED DESCRIPTION

Figure 1:
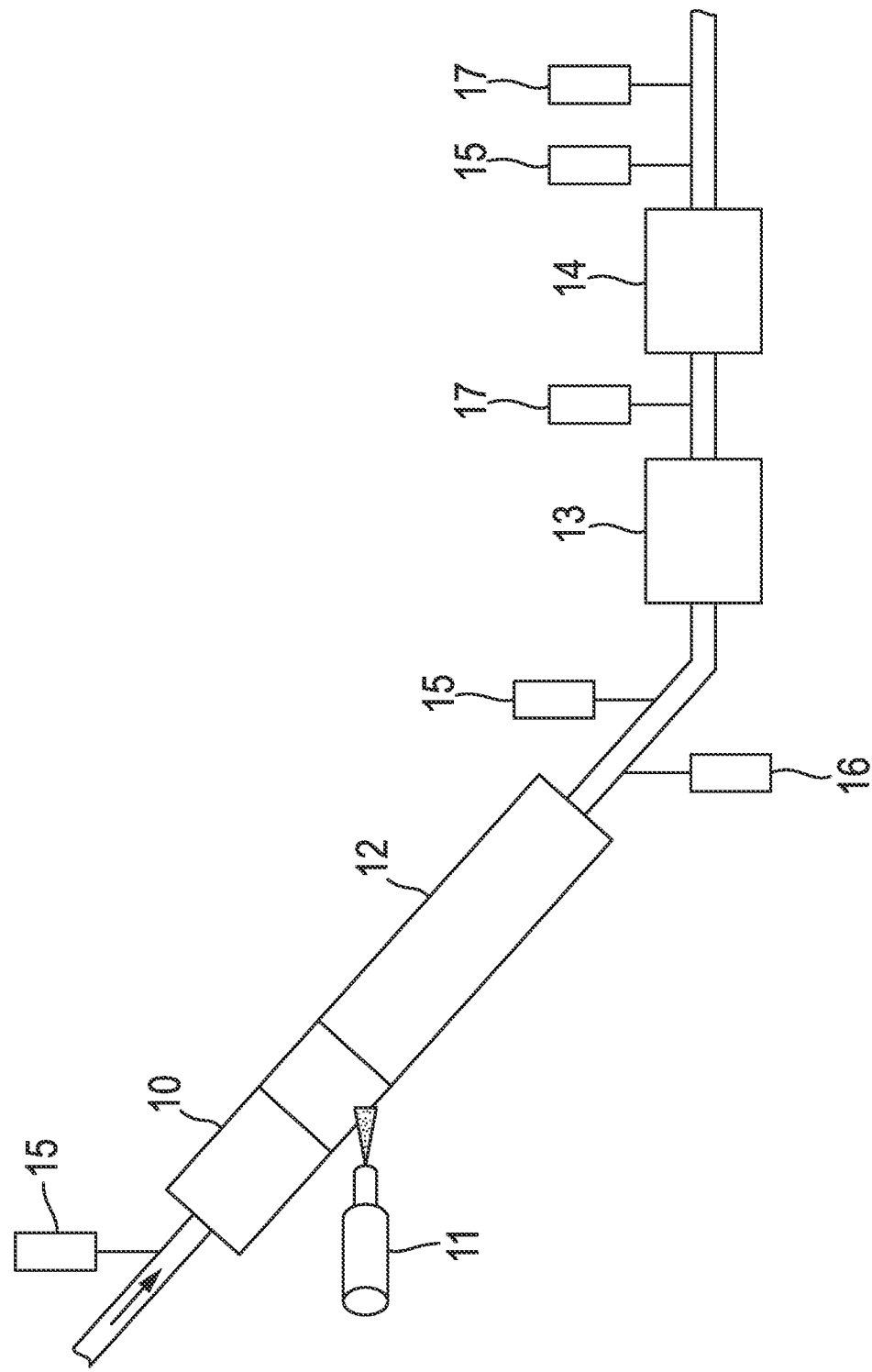
FIG. 1 shows a schematic illustration of the components in an exhaust system of an internal combustion machine for exhaust gas aftertreatment from the prior art and FIG. 2 shows a process schema for implementing the method according to the invention.

FIG. 1 shows an exemplary arrangement of the components in the exhaust system of an internal combustion machine with two SCR devices. The method according to the invention can be used advantageously with such an exhaust aftertreatment system. The method can, however, also be used with other exhaust aftertreatment systems comprising two or more SCR devices, e.g. two SCR catalyzers connected in series. In said configuration of the exhaust aftertreatment system a diesel oxidation catalyzer (DOC) 10 is provided first in the exhaust gas flow direction. This is followed in the exhaust gas flow direction by a dosing device 11 for the reactant of the SCR devices. A particle filter 12 with an SCR coating (SCRF) is provided as the first SCR device. An SCR catalyzer 13 is disposed after the SCRF 12. Finally another catalyzer, in this case a clean-up-cat (CuC) 14, is provided in order to complete the exhaust gas aftertreatment. The arrow gives the flow direction of the exhaust gas. Furthermore, various sensors are provided, in particular nitrogen oxide sensors 15, an $NH_3$ sensor 16 and temperature sensors 17. The values that can be recorded by means of the sensors 15, 16 and 17 are used for the process control. The position, type and number of the sensors 15, 16 and 17 shown is however purely exemplary and not essential for the method according to the invention. Instead of the measurement of the different variables, modeled values, indirectly detectable values or otherwise measured values can also be used for process control. Also the other catalyzers shown besides the SCR devices 12 and 13, i.e. in particular the oxidation catalyzer 10 and the clean-up catalyzer 14, are to be understood as being by way of example and do not play an essential role for the invention.

The essential components for the invention are the dosing point 11, the first SCR device 12 and the second SCR device 13.

The SCR devices of the exhaust gas aftertreatment system can e.g. be divided for reasons of installation space. Thus the second SCR device 13, i.e. the SCR catalyzer shown in said example, can e.g. be in two parts.

Figure 2:
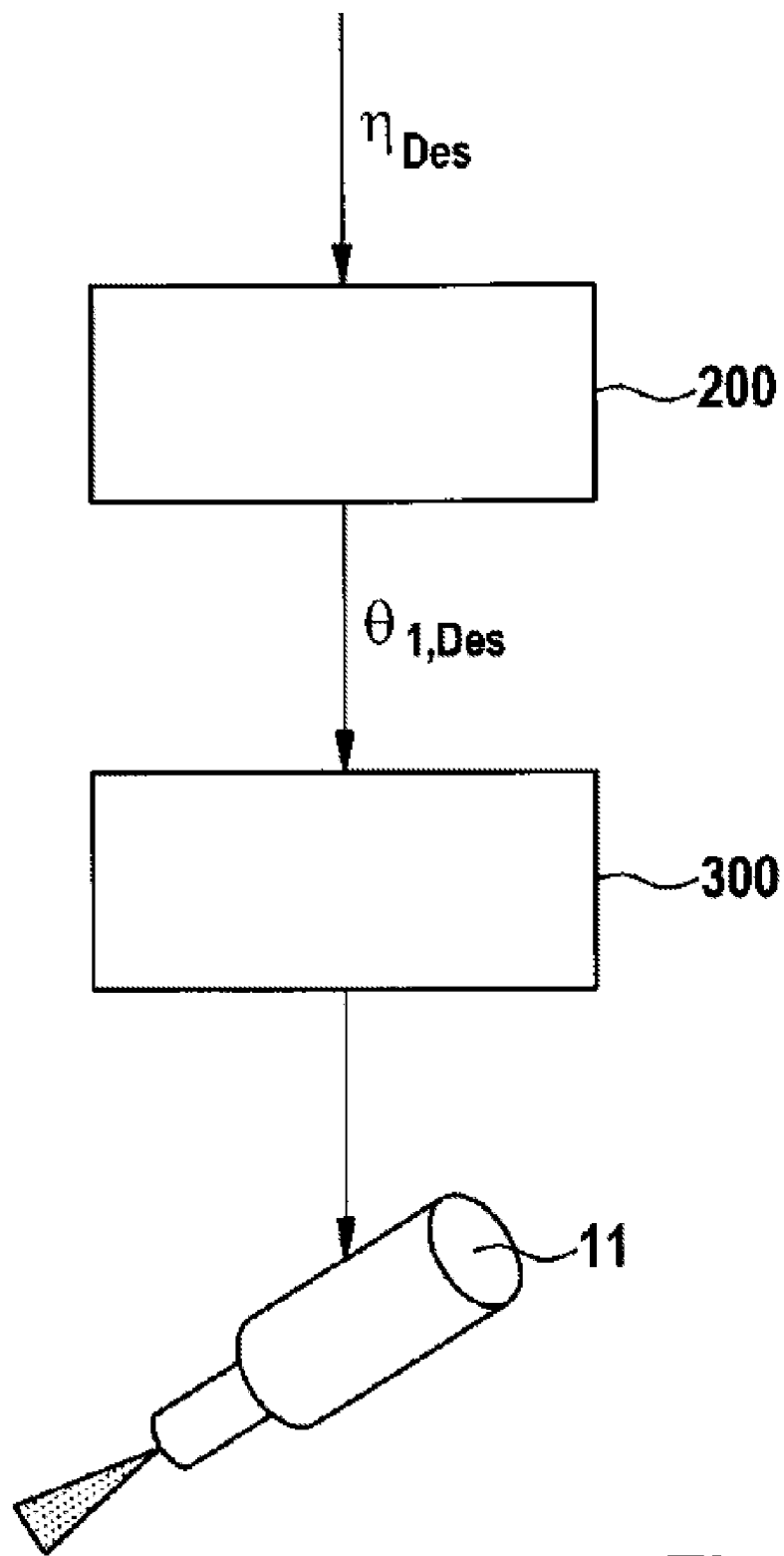

With the method according to the invention, optimization of the entire system for nitrogen oxides and ammonia is achieved using an analytical SCR model, wherein the two SCR devices 12 and 13 are not optimized separately, but both SCR devices 12 and 13 are treated as a complete system. Thus the NOx conversion can be optimized in said deNOx system, in order in particular to achieve a specified emission target. According to the invention, an overall efficiency $\eta_{Des}$ of the SCR devices 12 and 13 is specified. Using modeling of the exhaust gas aftertreatment system, depending on the target overall efficiency $\eta_{Des}$ a target value $\Theta_{1,Des}$ is determined that represents the degree of charge of the first SCR device 12 with reactant. FIG. 2 shows the process sequence schematically. According to the specification of the overall efficiency $\eta_{Des}$ an analytical SCR model 200 is used in order to determine the target value $\Theta_{1,Des}$ for the degree of charge of the first SCR device 12. With this value the dosing of the reactant is set in a step 300. Here the required quantity for achieving the overall efficiency $\Theta_{Des}$ is introduced by means of the dosing device 11 in the exhaust system upstream of the first SCR device 12. With said method the process control can be optimized e.g. in an SCRF-SCR system. Compared to conventional systems the method according to the invention provides the advantage that optimization of the entire system can be carried out with regard to NOx and $NH_3$, without the individual SCR devices having to be separately optimized. The optimal degree of charge for the first SCR device 12 that can be calculated by means of the analytical SCR model 200 can be adjusted very rapidly by means of the dosing 300, so that the system optimization according to the invention takes place very rapidly. Only one dosing point or dosing device 11 is necessary, by means of which the first SCR device 12 is provided with reducing agent. The dosing is adjusted so that the second SCR device 13 is provided with a sufficient quantity of reducing agent from the first SCR device 12 by means of the reducing agent slip. Optimal NOx conversion can be achieved in this way. At the same time a release of $NH_3$ ($NH_3$ slip) from the second SCR device 13 is minimized. The $NH_3$ slip would arise in particular by excessive charging of the second SCR catalyzer 13. Because the second SCR device 13 undertakes more NOx conversion, if the degree of charge of the second SCR device is higher, the less charge is required in the first SCR device 12. The tendency to $NH_3$ slip is thus implicitly minimized by the method according to the invention.

The process sequence shown schematically in FIG. 2 shows the calculation sequence e.g. in a control device, wherein the calculation leads into the corresponding dosing by means of the dosing device 11. The target overall efficiency $\eta_{Des}$ can be stored in the control device as a fixed application value or depending on e.g. the working point, temperature, mass flow, driving speed and/or previously accumulated NOx emissions. Using the analytical SCR overall model, taking into account the relevant variables (e.g. volumetric flow of exhaust gas, temperatures, level of SCR, $NO_2$/NOx ratio etc.) the target degree of charge for the first SCR device (e.g. SCRF) is calculated as $\Theta_{1,Des}$, wherein with this value the deNOx system has an overall efficiency of $\eta_{Des}$. For this purpose, in particular the following formula is advantageously used:

$$\theta_{1,Des} = \frac{-\dot{V}_1}{k_{reac1}\exp(-E_{reac1}/(R \cdot T_1))A_1}\ln(1-\eta_{Des}) - \frac{k_{reac2}\theta_2\exp(-E_{reac2}/(R \cdot T_2))A_2 T_1}{k_{reac1}\exp(-E_{reac1}/(R \cdot T_1))A_1 T_2}$$

$\dot{V}_1$ refers to the volumetric flow, $k_{reac}\exp(-\ldots)$ refers to an Arrhenius rule known from the literature for a first order reaction in NOx or other catalyzed reactions. The index 1 stands for variables in the first SCR device 12, e.g. in the SCRF, the index 2 refers to variables in the second SCR device 13, in particular in an SCR catalyzer. A refers to the respective active areas in the SCR devices 12 and 13 and T refers to the temperatures. The corresponding values can be recorded by means of suitable sensors or by indirect methods, simulations or models and can e.g. be provided in the control device. In said example various reactions known from the literature for the reduction of the nitrogen oxides (standard SCR, slow SCR, fast SCR) can be combined to form a representative reaction. Alternatively, it is likewise possible to establish a corresponding formula for the respective specific SCR reaction. The formula for the analytical SCR overall model can be calculated e.g. with the current volumetric flow or an average anticipated volumetric flow applied by the application programmer can be used.

Following the calculation of $\Theta_{1,Des}$ as the target degree of charge for the first SCR device 12, a normal level regulator, e.g. one that is used in series applications, can be used to perform the corresponding dosing of the reactant upstream of the first SCR device 12. Here a P controller for adjusting the level (level=degree of coverage (degree of charge)·maximum level) can be used for a pilot component, as is known to a person skilled in the art. Alternatively to such level control, e.g. two-point control can also be used, wherein dosing pulses are activated if the modeled level is lower than the target level. Here it can further be specified that the downstream SCR catalyzer 13 or the second SCR device 13 is not excessively charged with reactant.

For the method according to the invention, e.g. as an extension of a serial level control concept, it can be advantageous to examine whether the second SCR device 13 is not excessively charged. In particular, because of certain driving situations it can occur that the target, i.e. optimal, NOx conversion would only be achieved with considerable $NH_3$ slip. In such cases it is advantageous to examine the level of the second SCR device 13 and possibly to restrict the dosage to a mass flow that is e.g. lower than the equivalent quantity of $NH_3$ that is consumed by the NOx conversion in the entire deNOx system.

The method according to the invention is not restricted to a certain catalyzer material or a certain catalyzer reaction. Rather, besides the NOx reaction described here, other reactions running in a catalyzer can be optimized using the process control according to the invention. Examples thereof are an $NH_3$ oxidation, formation of nitrous oxide or formation of a nitrate. The corresponding reactions can be included in the modeling of the exhaust gas aftertreatment system according to the invention, so that an optimal dosage can be set for the respective reactant in each case.

Advantageously, other influencing variables can be taken into account in the model of the exhaust gas aftertreatment system that is used according to the invention. In particular, combustion residues, especially such as soot or ash in the first SCR device 12, can be taken into account, e.g. by using corresponding factors in the analytical SCR model.

With the exhaust gas aftertreatment system for which the method according to the invention is used, at least two SCR devices are provided. Here it is also possible that the method according to the invention is used with a system that comprises a virtual division into two parts of an SCR catalyzer that physically consists of a single part. This can for example be that case if the catalyzer is relatively long and has a corresponding temperature gradient. Even with such arrangements, the method according to the invention can be used advantageously.

The invention claimed is:

1. A method for operating an exhaust gas aftertreatment system with at least one first SCR device and at least one second SCR device and a single dosing device for reactant for the SCR devices disposed upstream of the first and second SCR devices in the exhaust gas flow direction, the method comprising:
specifying a target overall efficiency $\eta_{Des}$ of the SCR devices,
using modeling of the exhaust gas aftertreatment system, operate the SCR devices as a system by determining a target value $\Theta_{1,Des}$ depending on the target overall efficiency $\eta_{Des}$, the target value $\Theta_{1,Des}$ representing the degree of charging of the first SCR device with reactant to charge both of the SCR devices, where the second SCR device is charged using the $NH_3$ slip past the first SCR device, and
adjusting the dosing of the reactant to achieve the target value $\Theta_{1,Des}$.

2. The method according to claim 1, wherein the first SCR device is a particle filter with SCR coating and the second SCR device is an SCR catalyzer.

3. The method according to claim 1, wherein the target overall efficiency $\eta_{Des}$ is specified as a fixed application value or depending on different variables.

4. The method according to claim 1, wherein variables are included in the modeling of the exhaust gas aftertreatment system that represent the volumetric flow of exhaust gas and/or the mass flow of exhaust gas and/or temperatures and/or the level in at least one of the SCR devices and/or the ratio of $NO_2$ to NOx.

5. The method according to claim 4, wherein the value for the volumetric flow of exhaust gas and/or the mass flow of exhaust gas is an actual value or an average anticipated value.

6. The method according to claim 1, wherein the following formula is used for the modeling:

$$\theta_{1,Des} = \frac{-\dot{V}_1}{k_{reac1}\exp(-E_{reac1}/(R \cdot T_1))A_1}\ln(1-\eta_{Des}) - \frac{k_{reac2}\theta_2\exp(-E_{reac2}/(R \cdot T_2))A_2 T_1}{k_{reac1}\exp(-E_{reac1}/(R \cdot T_1))A_1 T_2}$$

wherein the index 1 stands for variables in the first SCR device and the index 2 stands for variables in the second SCR device and wherein $\dot{V}_1$ refers to the volumetric flow of exhaust gas, $k_{reac}\exp(-\ldots)$ refers to an Arrhenius rule for a catalytic reaction, especially an Arrhenius rule for a first order reaction in NOx, and A refers to the areas in the SCR device and T refers to the temperatures.

7. The method according to claim 1, wherein the modeling is carried out for a standard SCR reaction and/or for a slow SCR reaction and/or for a fast SCR reaction.

8. The method according to claim 1, wherein the modeling represents a combined reaction of different SCR reactions.

9. The method according to claim 1, wherein the dosing of the reactant takes place with a level regulator.

10. The method according to claim 1, wherein the degree of charge of the second SCR device is monitored and the dosing is adjusted.

11. The method according to claim 1, wherein combustion residues in the SCR devices are taken into account with the method.

12. A computer program that carries out all steps of a method according to claim 1 if it is executed on a computing device or a control device.

13. The computer program product with program code that is stored on a machine-readable medium for carrying out a method according to claim 1 if the program is executed on a computing device or a control device.

* * * * *